Figure 9:
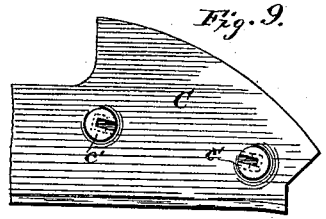

(No Model.) 3 Sheets—Sheet 1.
G. B. CASADAY.
PLOW.
No. 321,187. Patented June 30, 1885.
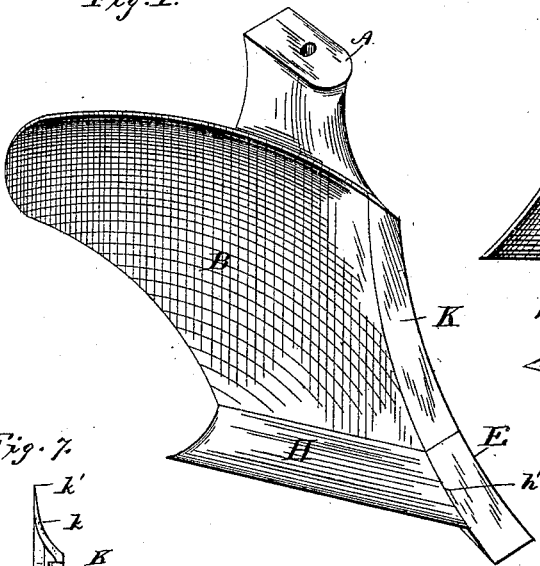
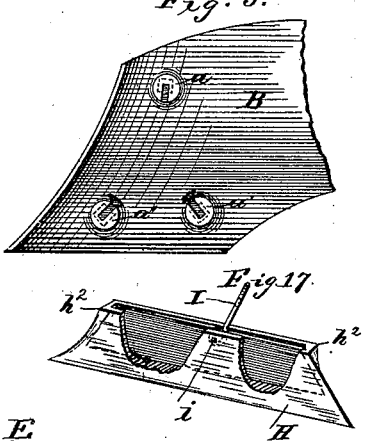
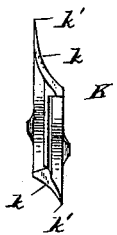
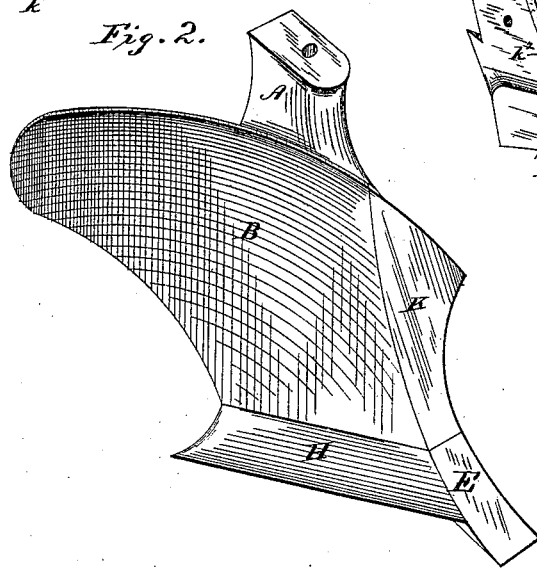
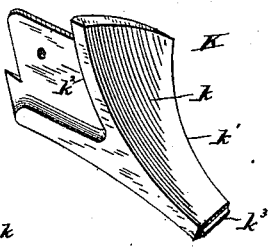
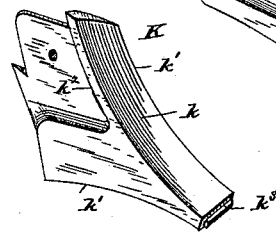
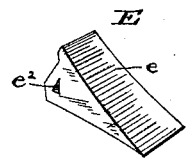
WITNESSES
Chas. R. Burr
James M. Durant
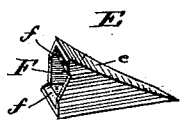
INVENTOR
George Burdet Casaday
By Franck D. Johns
Attorney (No Model.)  3 Sheets—Sheet 2.

G. B. CASADAY.
PLOW.

No. 321,187. Patented June 30, 1885.

WITNESSES
Chas. R. Burr
James M. Durant

INVENTOR
George Burdet Casaday
By Franck D. Johns
Attorney

N. PETERS, Photo-Lithographer, Washington, D. C.

(No Model.)  3 Sheets—Sheet 3.
G. B. CASADAY.
PLOW.
No. 321,187.  Patented June 30, 1885.
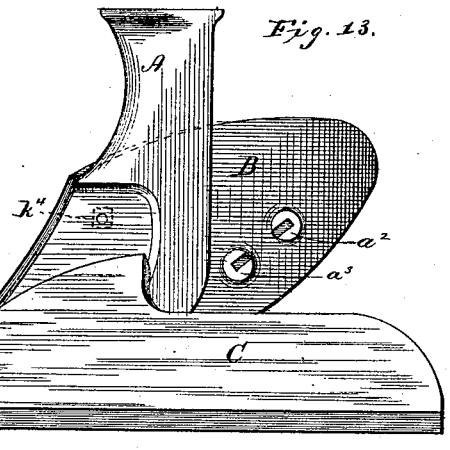
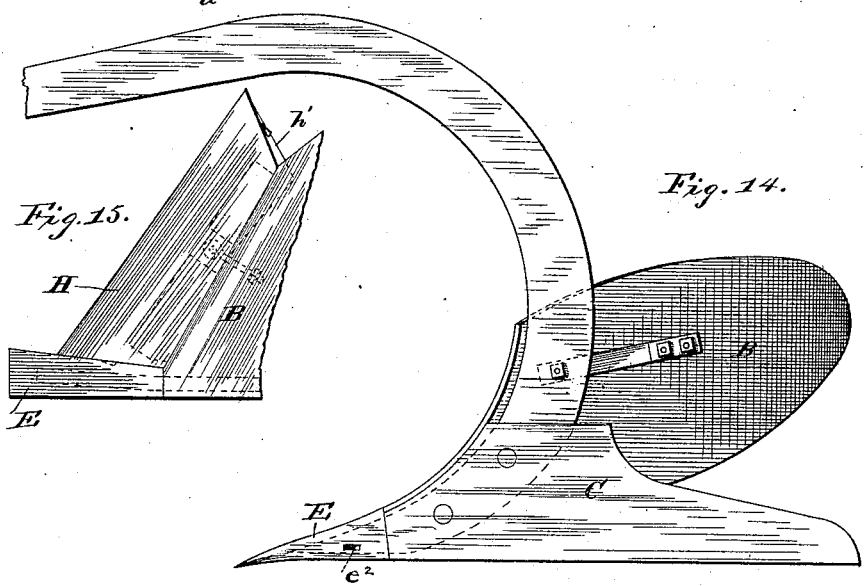
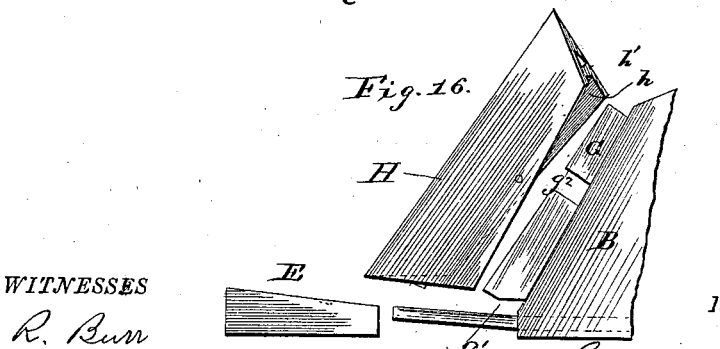
WITNESSES
Chas. R. Burr
James M. Durant
INVENTOR
George Burdet Casaday
By Frank D. Johns
Attorney

UNITED STATES PATENT OFFICE.

GEORGE BURDET CASADAY, OF HUDSON, LA PORTE COUNTY, ASSIGNOR OF ONE-HALF TO WILLIAM L. CASADAY, OF SOUTH BEND, INDIANA.

PLOW.

SPECIFICATION forming part of Letters Patent No. 321,187, dated June 30, 1885.

Application filed January 13, 1885. (No model.)

*To all whom it may concern:*

Be it known that I, GEORGE BURDET CASADAY, a citizen of the United States, residing in Hudson township, in the county of La Porte and State of Indiana, have invented certain new and useful Improvements in Plows; and I do hereby declare the following to be a full, clear, and exact description of the invention, such as will enable others skilled in the art to which it appertains to make and use the same.

My invention relates to certain improvements in that class of plows having reversible cutting or wearing edges. It is adapted to be used with plows of all kinds, but especially with such as are known as "cast" or "chilled" plows; and it has for its object to provide reversible cutting or wearing edges, attached to the standard by simple and strong means, having accurate and closely fitting joints held together firmly and securely, and having the wearing-faces of the reversible parts flush with the surface of the mold-board. It has for a further object to provide a means of attaching the several parts of the plow to the standard so that but few bolts will be required, and these so placed that they will not be upon the wearing-face of any of the various parts, and so that the under side of the plow is free from projecting bolts or connections, thus preventing dirt from catching on the bolt-heads or nuts, and giving a perfect clearance, thus obviating the objectionable features of plows of this class that have heretofore been in use, and at the same time producing a strong, durable, and efficient plow, which can be manufactured very cheaply.

My invention consists, essentially, of a standard provided with suitable extensions or bearings and shoulders, a reversible hollow point adapted to fit over one of the bearings or nose of the standard, and held in position by a longitudinally-slotted reversible wing or share fitting on a long bearing on the standard and fastened to the same by a suitable bolt secured to the inside of said slotted wing, said parts fitting snugly against and flush with the face of the mold-board; and it further consists in a reversible shin or cutter, resting against a shoulder on the standard and held in place by suitable bolts.

A further feature of my invention consists in providing a mold-board and landside with slotted bosses on their inner faces, which hold the heads of the attaching-bolts, said mold-board and landside thus being fastened to the standard without the bolt-heads projecting through on their wearing-faces.

The particular construction and arrangement of my invention I will now proceed to point out and describe, reference being had to the accompanying drawings, in which—

Figure 10:
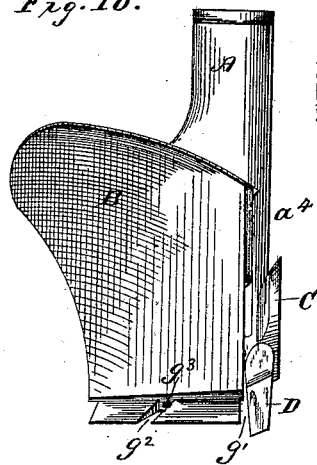
Figure 12:
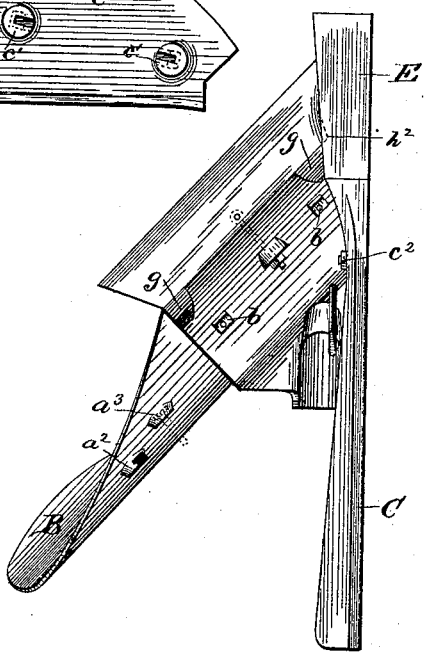
Figure 11:
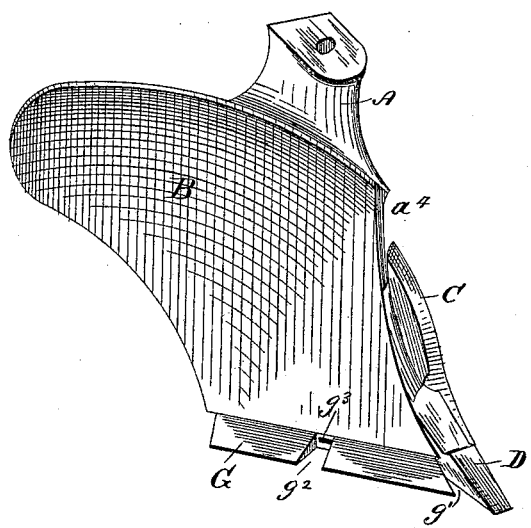

Figures 1 and 2 are perspectives of complete plows. Fig. 3 is a detail showing the under side of the mold-board. Figs. 4, 5, 6, 7, and 8 are details showing different forms and views of the reversible cutter. Fig. 9 is a detail showing portion of the inner side of the landside. Fig. 10 is a front elevation with the reversible parts removed. Fig. 11 is a perspective with the reversible parts removed. Fig. 12 is a perspective of the plow inverted. Fig. 13 is a side elevation showing landside. Fig. 14 is a modification. Figs. 15, 16, and 17 are details.

Referring to said drawings, A is the standard; B, the mold-board, having on its under side slotted bosses $a\,a'$, which receive the heads of the attaching-bolts $b$, the slots in said bosses $a\,a'$ opening in opposite directions. The bolts $b$ pass through bolt-holes in the standard and secure the mold-board to the same. $a^2\,a^3$ are slotted bosses opening in opposite directions and adapted to hold the heads of the bolts by which the handles are attached. The lower edge of the mold-board is formed in a straight line, and when secured to the standard forms a shoulder, against which the upper edge of the working-face of the wing or share bears.

C is the landside, provided with slotted bosses $c\,c'$ on its inner side, which receive and hold the heads of the bolts $c^2$ by which the landside is attached to the standard, the slots in the bosses $c\,c'$ opening in opposite directions. It will thus be seen that the heads of the attaching-bolts do not project through upon the wearing-face of either the landside or mold-board. Suitable depressions can be made in the standard to receive the bosses on the mold-board and landside.

D is a bearing or nose cast upon the lower end or foot of the standard. $d$ is a shoulder on the under side of said bearing.

E is a reversible point made with similarly-tapered opposite wearing-faces $e\ e'$ of any desired shape to suit the class of plows on which it is to be used, said opposite faces being identical in form. The opposite sides of the point are plane surfaces, nearly parallel with each other, and are provided with notches $e^2$, for purpose hereinafter set forth. Said point is made with a socket, F, which conforms to the shape of the bearing D, and is adapted to fit neatly on said bearing. The rear edges of said point rest against and form a perfect joint with the shoulder $d$, lower edge of the cutter or mold-board when used on plows not having a removable cutter, and the forward end of the landside. When adjusted, one side of the point is flush and in line with the outer face of the land-side and its upper working-face conforms to the shape of the cutter and mold-board. $f$ are shoulders on the mouth of the socket. The bearing D extends down nearly to the end of the point, greatly reducing the leverage on said point and strengthening the standard.

The construction of the bearing D as above described is preferred when used with a cast or chilled plow, the standard being made of any of the ordinary materials. A similar bearing can be formed upon a wrought-iron standard used with ordinary plows, or it can be formed upon the extreme lower end of the steel beam used with steel plows, as shown in Fig. 14.

G is a long wedge-shaped bearing on the foot of the standard.

$g$ is a shoulder on the under side of the bearing, the lower straight edge of the mold-board forming a similar shoulder on the upper side of the bearing G, said mold-board being the same distance from the lower edge of the bearing as the shoulder $g$.

$g'$ is a slot between the bearings D and G.

$g^2$ is a notch located about the center of the bearing G, and $g^3$ is a bolt-hole extending through to the inner side of the standard.

H is a reversible wing or share having two opposite wearing-faces identical in form. $h$ is a longitudinal slot in said wing, extending nearly down to its lower edge, conforming to the shape of the bearing G, and adapted to fit snugly over said bearing. As said bearing extends down almost to the cutting-edge of the wing, said wing can be made very light. The diagonally-opposite edges $h'$ are straight, and incline inward toward the top of the wing or share. One of said edges $h'$ fits close against the point E.

$h^2$ are projections which engage with the notch $e^2$ on the side of the point E and lock the same securely in place and form a perfect joint between the point and share, the working-faces of both being flush with each other.

In the plow shown in Figs. 14, 15, and 16 the wing is provided with a lug, $h^2$, instead of a projecting corner, as above described. The upper edges of the reversible share are made perfectly straight and in the same plane, and conform to the lower line of the mold-board. The rear ends of the working-faces of said share can be rounded off, as shown.

I is a hook-bolt hooking onto the pin or partition $i$ within the slot $h$. Said bolt passes up through the bolt-hole $g^3$, and is secured in place by a suitable nut. In heavy plows, if necessary, two or more bolts may be used. This bolt I may be secured in any other manner to the inside of the reversible wing, or it may be made in any other suitable form; but the device described is preferred. To adjust the point and wing or share, place the point upon its bearing. Then adjust the wing on the bearing G and the bolt in the bolt-hole. Then by tightening up the nut on said bolt I the wing is drawn snugly upon the bearing G and tight against the mold-board and point. The projections $h^2$, engaging with the notches $e^2$, draw the point firmly on its bearing and securely lock it in position. A perfect joint is thus formed between the share and point and the share and mold-board. The attaching-bolt, as will be seen, is secured to the share within the slot in said share, and its head is not exposed upon the wearing-face of the same. The bolt passing up through the standard, is out of the way, and gives the greatest possible clearance, as there are no bolts to drag in the bottom of the furrow, and the share overlapping the bearing the shoulder on the under side does not come below the smooth surface of the under face of said share. This construction prevents dirt from catching against said shoulder and filling up the bottom of the plow.

K is a reversible shin or cutter having the opposite wearing-faces $k$, cutting-edges $k'$, and shoulders $k^2$, the sides of said cutter resting against the standard, and conforms to the line of the mold-board, so that it forms a perfect and tight joint with the same, and bringing its working-face flush with said mold-board. The shoulder $k^2$ rests against the shoulder $a^4$ on the standard, the wearing-face not in use resting against and conforming to the upper line of the landside, the outer side of said cutter being in the same plane with the outer face of the landside. The standard A is cut away sufficiently to receive the cutting-edge not in use, or a slot may be made in said standard, through which said cutter may project, as shown.

$k^3$ is a bearing on the lower end of the cutter, which projects under and rests against the shoulder $f$ on the mouth of the socket F in the point E. Said point E being placed in position upon the bearing D, engages with the bearing $k^3$ and securely locks the lower end of said cutter in position.

$k^4$ is a bolt securing the cutter to the standard. It will be seen that both wearing-faces conform to the lines of the mold-board, and are reversible at pleasure.

Figure 6:
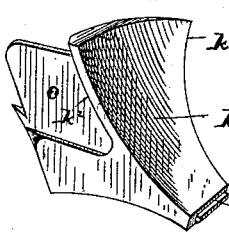
Figure 8:
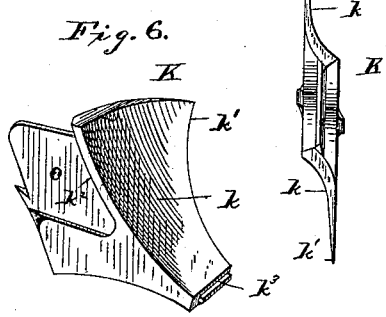

For convenience in grinding, I make a cutter having but one projecting cutting-edge, $k'$, the other face being plain, as shown in Figs. 1, 4, and 6. By adjusting this cutter with the plain face up the plow can be ground as easily as if the mold-board and cutter were in one piece.

In the construction above described I produce a plow having all of its cutting-edges reversible, thus greatly increasing the life of the plow, and at the same time making it strong and durable, and having perfectly-fitting joints and the working-faces of the reversible parts flush with the mold-board. It will also be seen that none of the heads of the attaching-bolts appear upon the wearing-faces of any of the various parts, and no bolts or connections project from the bottom of the plow or in any way drag in the furrow; and the wing or share fitting over its bearing is flush with the shoulder on the under side of said bearing, presenting a smooth surface, and rendering it impossible for dirt to collect in the bottom of the plow.

Having thus fully described my invention, I claim as new, and desire to secure by Letters Patent—

1. In a plow, the combination, with the standard, of a hollow reversible point fitted upon the lower forward end of the standard, and a removable wing operating when secured in position to positively lock the point in place, substantially as shown and described.

2. In a plow, the combination, with the standard, of a hollow reversible point fitted upon the lower forward end of the standard, and a hollow reversible wing fitted on a wing-bearing on the standard, and operating when in position to positively lock the point in place, substantially as shown and described.

3. In a plow, the combination, with the standard, mold-board, and a reversible cutter, of a hollow reversible point fitted on the lower forward end of the standard and forming a continuation of the cutter, and a hollow reversible wing fitted on a wing bearing on the standard, and operating when in position to positively lock the point in place, substantially as shown and described.

4. In a plow, the combination, with the standard and mold-board, of a removable and reversible shin or cutter secured to the standard and presenting when either side is in use a cutting-edge and a wearing-surface conforming to and forming a continuation of the mold-board, substantially as shown and described.

5. In a plow, the combination, with the standard and mold-board, of the removable and reversible shin or cutter having two opposite wearing-faces and cutting-edges and two sets of bearing-surfaces independent of the wearing-faces, and upon which it is supported and connected to the standard, substantially as shown and described.

6. In a plow, the removable and reversible shin or cutter K, having the duplicate wearing-faces and cutting-edges, and the duplicate shoulders $k^2$ and bearing $k^3$ on its lower end, in combination with the standard having the shoulder $a^4$, the mold-board and hollow reversible point engaging when adjusted with the bearing $k^3$, all constructed and arranged substantially as shown and described.

In testimony whereof affix my signature in presence of two witnesses.

GEORGE BURDET CASADAY.

Witnesses:
ROBERT MYLER,
E. W. BOWERS.